(12) United States Patent
Hung-Che et al.

(10) Patent No.: US 6,335,802 B1
(45) Date of Patent: *Jan. 1, 2002

(54) IMAGE READING HEAD

(75) Inventors: Chang Hung-Che; Chen Yen-Cheng, both of Hsin-Chu (TW)

(73) Assignee: Avision Inc., Hsinchu (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/821,217

(22) Filed: Mar. 20, 1997

(51) Int. Cl.[7] .............................. H04N 1/23; H04N 1/40; G03G 15/28
(52) U.S. Cl. ........................ 358/296; 358/471; 399/211
(58) Field of Search ................................. 358/296, 471, 358/474, 505; 382/263; 399/209, 211; 347/37

(56) References Cited

U.S. PATENT DOCUMENTS

| | | | | |
|---|---|---|---|---|
| 4,525,748 A | * | 6/1985 | Carbone et al. | 358/456 |
| 5,235,353 A | * | 8/1993 | Hirano et al. | 347/37 |
| 5,669,048 A | * | 9/1997 | Nishio et al. | 399/206 |

* cited by examiner

Primary Examiner—Gregory J. Toatley, Jr.
(74) Attorney, Agent, or Firm—Winston Hsu

(57) ABSTRACT

An optical reader and the driving motor of a scanner are integrally mounted on a movable module, which can slide back and forth along a track to scan an image. The driving motor exerts a force on a fixed rack attached to the frame of the scanner through a pinion. The reaction to the force causes the movable module to slide. The rack and pinion mechanism can be replaced with a friction tape and roller combination, or a steel wire wrapped around a wheel attached to the movable module.

11 Claims, 4 Drawing Sheets

IMAGE READING HEAD

BACKGROUND OF THE INVENTION

1. Field of the Invention

This invention relates to an image reading head for an image scanner, a facsimile machine, or a copier. In particular, the present invention discloses a flat bed image reading head having a motor mounted thereon.

2. Description of the Prior Art

Flat bed image scanners are widely used today as periphery equipment for computers. A flat bed image scanner can rapidly scan a document, a magazine, a book, a graph or a picture for inputting images thereof into a computer for processing. A flat bed scanner has an optical reader, a driving mechanism, a processing circuit, a scanning window and a frame. Today, the trend is to make the scanner lightweight, thin, narrow and miniaturized. It is thus desirable that the optical reading mechanism and the driving mechanism occupy as little space as possible.

A conventional image reading head 199 is shown in FIG. 1 and includes: a light source 101, a series of reflecting mirrors 131, 132, 133, a lens 104 and an image sensor 105. The driving mechanism includes: a motor 107, a gear train 108, an idler 181, a closed-loop belt 109, and a sliding rail 110. The operation of the flat bed scanner is as follows: Referring to FIG. 1, a document D to be scanned is placed on top of a window 102. After the light source 101 illuminates the document D, the reflected light from the document D reflects from the reflecting mirrors 131, 132, 133 to the lens 104 to reach the image sensor 105. The image sensor 105 feeds image signals to an image processing circuit (not shown) for digitizing the signals, which are then fed to a computer for further processing. When the image sensor 105 completes a row of image signals, the driving mechanism moves the image reader to a next scanning area until the whole image is read.

Structurally, the advancing motor 107 and the gear train 108 are both fixed on the frame 112. The closed-loop belt 109 has one end connected to the gear train 108 and the other end connected to the idler 181. The closed-loop belt 109 is attached to the optical reading mechanism 199 to move the optical reading mechanism for effecting scanning action.

SUMMARY OF THE INVENTION

An object of this invention is to reduce the size of a flat bed scanner. Another object of this invention is to reduce the number of parts in a flat bed scanner to enhance the quality and to reduce the cost of the flat bed scanner.

These objects are obtained by combining the driving mechanism and the reading mechanism of the scanner into the same module. A fixture is mounted on the frame of the scanner. When the driving mechanism exerts a force on the fixture, the reaction causes the movable module to slide back and forth along a guiding portion and to scan the image to be read. The force from the movable module can be exerted on the fixture through a rack and pinion mechanism or through a friction wheel and friction tape.

DETAILED DESCRIPTION OF THE PREFERRED EMBODIMENT

Figure 2:
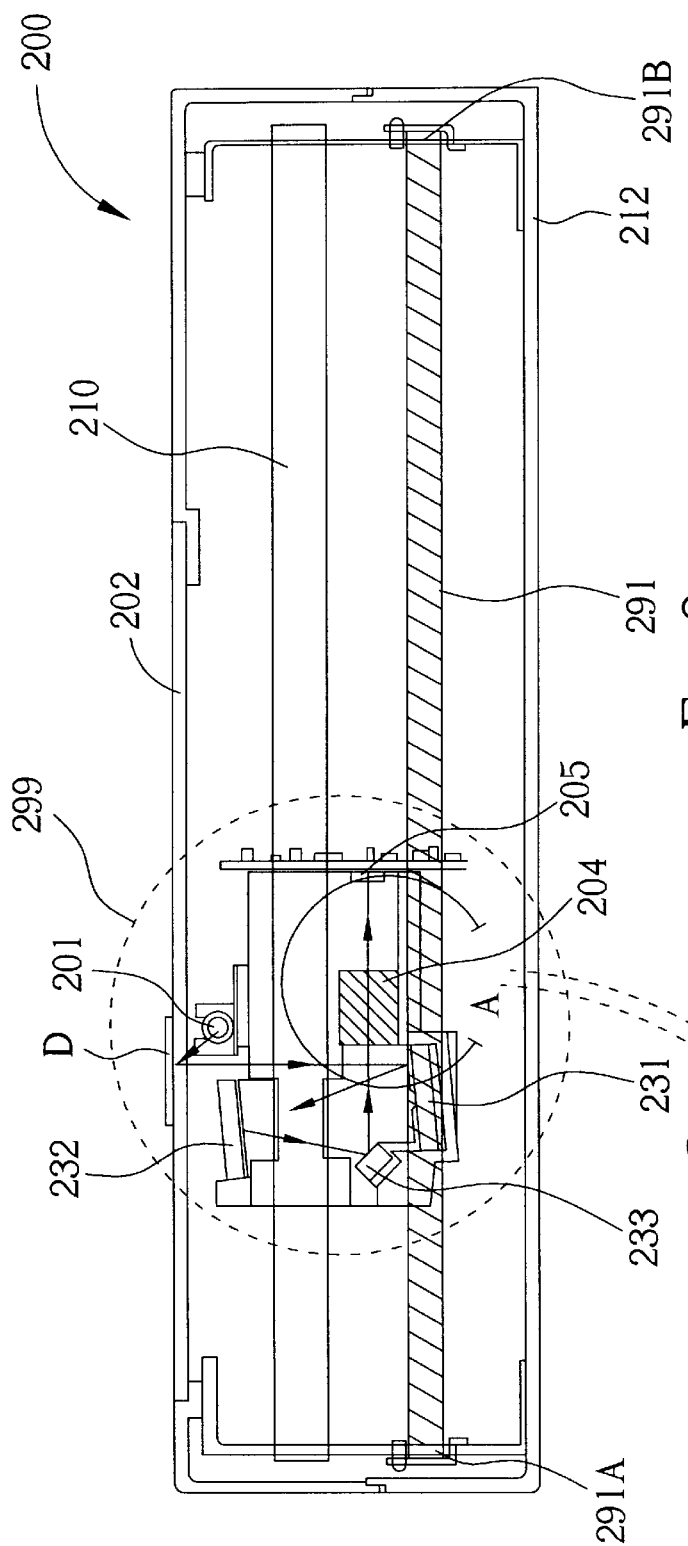
FIG. 2 shows a side view of an image reading head in a scanner structure based on the present invention.
Figure 3:
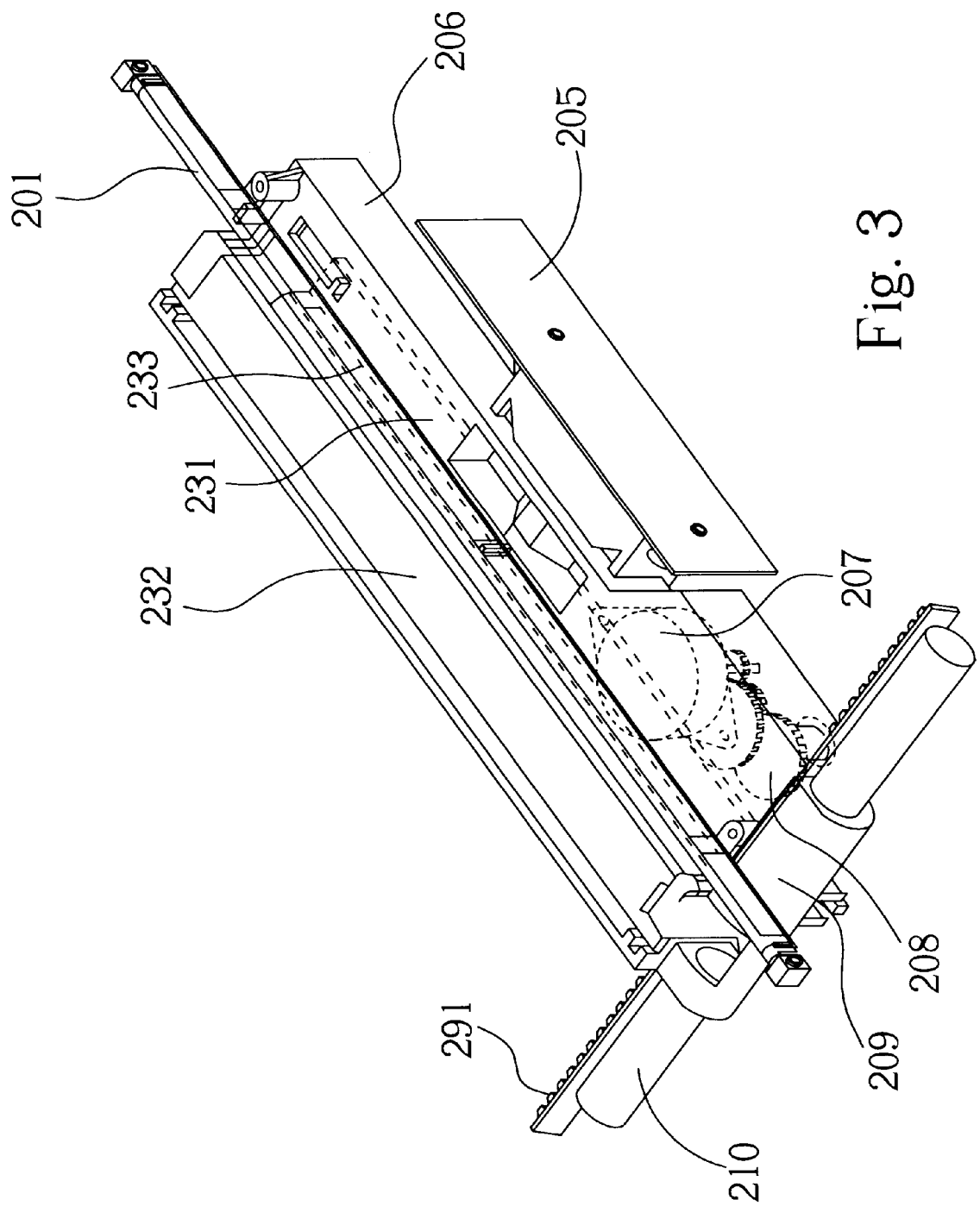
FIG. 3 is a perspective view of a scanning module of the present invention.

To achieve the object of the present invention, a drastic modification of the driving mechanism of a conventional scanner has been made. A completely new design is used to mount the driving mechanism onto the optical reading mechanism 199. Referring to FIG. 2, a present invention flat bed scanner 200 combines a driving mechanism 207 with an image sensor 205 to form a combined optical reading and driving scanning module 299. This combined reading/driving scanning module 299 utilizes the engagement of a gear or pinion 208 with a belt 291. The belt 291 is a straight line rack with teeth on one side and with the two ends fixed at two stationary posts 291A and 291B to form a rack and pinion mechanism. An enlarged view of the rack and pinion mechanism is shown FIG. 4. When the pinion 208 rotates, it drags the scanning module 299. Due to the action and reaction with the belt 291, the scanning module 299 moves back and forth along a guiding rail 210 to perform scanning of a document D placed on a window 202 of the flat bed scanner 200. As explained in the Description of the Prior Art, a light source 201 of the flat bed scanner 200 is used to illuminate the document D. Light from the document D reflects from mirrors 231, 232 and 233 through lens 204 to the image sensor 205. With reference to FIGS. 2 and 3, the scanning module 299 is connected to the guiding rail 210 through a sleeve 209 on which the scanning module 299 is mounted and which can glide along the guiding rail 210.

Figure 1:
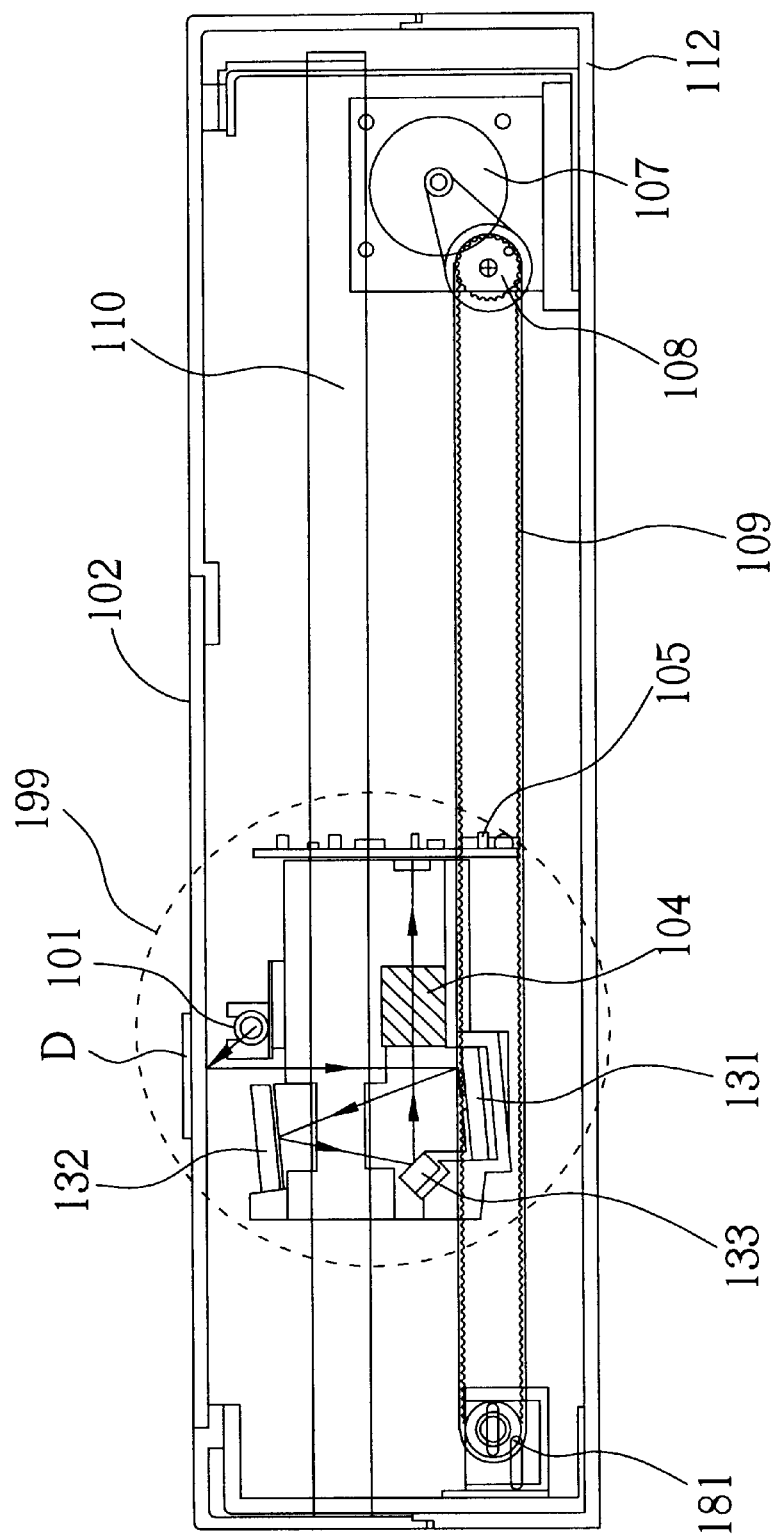
FIG. 1 shows an image reading head for a prior art flat bed scanner.

In comparison with conventional structure, the present invention has the following features:

In terms of components, the present invention eliminates the idler 181 shown in FIG. 1.

In terms of space, the present invention saves the space occupied by the motor 107, the gear train 108, and the idler 181. The space occupied by the belt is reduced by at least a factor of 2.

In terms of motion, the conventional technique uses a closed-loop belt 109, which rotates during operation, whereas the present invention scanner 200 uses a stationary rack-type belt which is fixed at the two ends at posts 291A and 291B.

In terms of structure, the conventional method uses a closed-loop belt 109 which is fixed to the image reading module 199, whereas in the present invention, the rack-type belt 291 meshes the scanning module 299 with the pinion 208.

One embodiment of the present invention is shown in FIG. 2. The scanning module 299 is mounted with the motor 207 and pinion 208. Due to the meshing of the teeth of the pinion 208 with those of the rack-type belt 291, the scanning module 299 is activated and moved. The rack-type belt 291 has its ends fixed at posts 291A and 291B which, in turn, are fixed on the frame 212.

Figure 4:
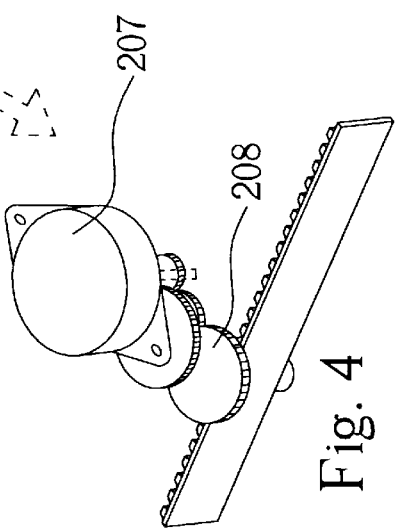
FIG. 4 is an enlarged view of a portion of FIG. 2 depicting a rack and pinion mechanism.

Referring to FIG. 4, when the scanning module 299 scans an area of an image on document D, the motor 207 transfers its power through the pinion 208 to the rack-type belt 291. Since the belt 291 is stationary, the scanning module 299 is driven back and forth along the guiding rail 210 to perform the scanning function. The present invention uses a novel design to mount the advancing motor 207 and the pinion 208 onto the reading module 199 of the conventional design.

Unused space adjacent the lens 104 of a conventional design is fully utilized with the motor 207, and so the volume of the scanning module 299 of the present invention flat bed scanner 200 is no larger than the space occupied by the conventional reading module 199. With the motor 207 of the present invention being mounted in the unused space adjacent to the lens 204, space normally occupied by the motor 107 and the gear train 108 is thereby saved. In addition, due to the reduction of component parts, the reliability of the flat bed scanner 200 is improved, and costs are reduced.

In another embodiment of the present invention, the reaction rack-type belt 291 is installed as a part of the frame 212 of the flat bed scanner 200, since the rack 291 is stationary. The reaction mechanism is formed directly on the frame 212 during fabrication, and saves the space of the belt 291 and its associated stationary parts used in the first embodiment. Thus, the component parts of the flat bed scanner 200 are further reduced, resulting in improved reliability and cost benefits over the first embodiment. In comparison with conventional structure shown in FIG. 1, this second embodiment has the following features:

In terms of components, the second embodiment of the present invention does not require the idler 181, belt 109 and fixtures for the belt 109.

In terms of space, this invention saves on the space occupied by the advancing motor 107, the gear train 108 and the idler 181, and the space occupied by the belt 109.

In terms of motion, the conventional technique uses a moving closed-loop belt 109, while this second embodiment of the present invention utilizes the reaction of the frame 212 to propel the moving scanning module 299. The principle of operation is totally different. There is no motion of the belt 109.

In terms of structure, the optical reading module 199 is attached to the belt 109 at a fixed point. This invention uses the reaction of the frame 212 to propel the scanning module 299.

Figure 5:
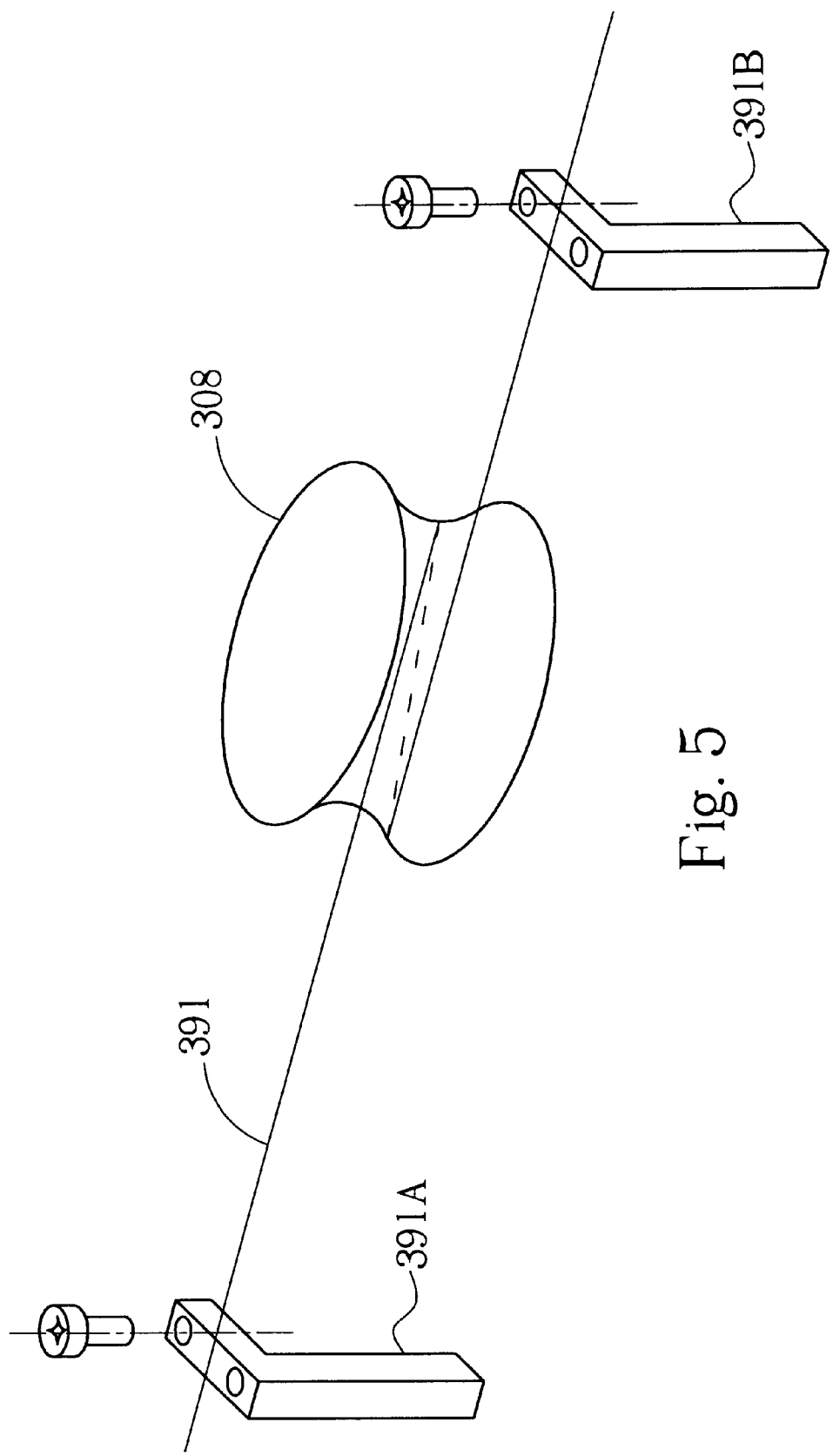
FIG. 5 shows a wire wrapping around a driven wheel attached to a scanning module of the present invention.

The foregoing embodiments are merely the preferred examples of the present invention, and are by no means limited to these two examples. Any embodiment using equivalent principles is within the scope of this invention. For example, the rack and pinion structure can be replaced with roller and friction tapes; or, alternatively, the rack and pinion mechanism maybe replaced with a driving wheel 308 and a steel line 391 as shown in FIG. 5, in which the steel line 391 has two ends fixed to two posts 391A and 391B on the frame 212. The steel line 391 wraps around the driving wheel 308, which is attached to the scanning module 299, and the scanning module 299 moves back and forth when the driving wheel 308 turns. The sleeve 209 sliding on the guiding rail 210 can be replaced with wheels sliding on a track. These equivalent techniques are all within the scope of this invention. in the first embodiment. In comparison with conventional structure shown in FIG. 1, this second embodiment has the following features:

In terms of components, the present invention saves the idler 181, belt 109 and the fixtures for the belt 109.

In terms of space, this invention saves the space occupied by the advancing motor 107, the gear train 108 and the idler 181, and the space occupied by the belt 109.

In terms of motion, the conventional technique uses a moving closed-loop belt 109, while this invention utilizes the reaction of the frame to propel the moving read/drive module 299. The principle of operation is totally different. There is no motion of the belt 109.

In terms of structure, the optical reading module 199 is attached to the belt 109 at a fixed point. This invention uses the reaction of the frame to propel the read/drive module. The principle of operation is totally different. There is no corresponding part of the belt 109 in the present invention.

The foregoing embodiments are merely the preferred examples of the present invention, and are by no means limited to these two examples. Any embodiments using equivalent principle are all within the scope of this invention. For example, the rack and pinion structure can be replaced with roller and friction tapes; or, alternatively, the rack and pinion mechanism may be replaced with a driving wheel 308 and a steel line 391 as shown in FIG. 5, in which the wire with two ends fixed to two posts 391A, 391B on the frame wraps around the driving wheel 308 attached to the reading/driving module, and the reading/driving module moves back and forth when the driving wheel 308 turns. The sleeve sliding on the track can be replaced with wheels sliding on the track. These equivalent techniques are all within the scope of this invention.

What is claimed is:

1. A flat bed scanner for scanning a document, the flat bed scanner comprising:
   a frame;
   a window mounted on the frame, the document to be scanned being placed on the window;
   a guiding portion disposed within the frame along a direction of scanning; and
   a scanning module movably disposed under the window for moving along the guiding portion to scan the document, the scanning module comprising:
      an image sensor for receiving light from the document to generate corresponding image signals; and
      a driving motor for driving the scanning module along the guiding portion.

2. The flat bed scanner of claim 1 wherein the scanning module further comprises a light source for illuminating the document, and mirrors for reflecting light from the document to the image sensor through a lens mounted within the scanning module.

3. The flat bed scanner of claim 1, further comprising a rack with a plurality of teeth, and the scanning module further comprises a pinion driven by the motor to engage with the rack to form a rack and pinion mechanism to drive the scanning module along the guiding portion.

4. The flat bed scanner of claim 3 wherein the rack is a belt.

5. The flat bed scanner of claim 3 wherein the rack is formed as part of the frame.

6. The flat bed scanner of claim 1, further comprising a friction tape, and the scanning module further comprises a roller in contact with the friction tape and driven by the motor to drive the scanning module along the guiding portion.

7. The flat bed scanner of claim 1 wherein the guiding portion is a guiding rail, and the scanning module further comprises a sleeve for slidingly mounting the scanning module onto the guiding rail.

8. The flat bed scanner of claim 1 wherein the scanning module further comprises wheels that enable the scanning module to roll along the guiding portion.

9. The flat bed scanner of claim 1 wherein a steel line with two ends fixed on the frame wraps around a wheel which is attached to the scanning module and moves the scanning module when the wheel is driven by the motor.

10. The scanning module of claim 1 wherein unused space is adjacent to the image sensor, and the motor is mounted in the unused space so that the motor does not increase a total size of the scanning module.

11. A scanning module for a flat bed scanner, the scanning module being used to scan a document placed on a window of the flat bed scanner, said scanning module comprising:

a light source for illuminating the document;

a plurality of mirrors for reflecting light from the document;

a lens for receiving and outputting the light from the plurality of mirrors;

an image sensor for receiving the light from the lens; and a motor arranged beside the lens and the image sensor for driving the scanning module to cause the scanning module to move.

\* \* \* \* \*